(12) United States Patent
Zhu et al.

(10) Patent No.: US 11,862,966 B2
(45) Date of Patent: Jan. 2, 2024

(54) SURGE PROTECTOR

(71) Applicant: Cisco Technology, Inc., San Jose, CA (US)

(72) Inventors: Xiqun Zhu, Sunnyvale, CA (US); Sung K. Baek, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 17/451,520

(22) Filed: Oct. 20, 2021

(65) Prior Publication Data

US 2023/0122603 A1 Apr. 20, 2023

(51) Int. Cl.
*H02H 9/04* (2006.01)
*H02H 3/22* (2006.01)
*H02H 3/24* (2006.01)

(52) U.S. Cl.
CPC .............. *H02H 9/04* (2013.01); *H02H 3/22* (2013.01); *H02H 3/24* (2013.01)

(58) Field of Classification Search
CPC ........ H01G 9/18; H01L 27/0266; H02H 3/20; H02H 3/22; H02H 3/24; H02H 9/001; H02H 9/02; H02H 9/025; H02H 9/04; H02H 9/041; H03K 17/0822; H03K 17/302; H03K 17/6871; H03K 17/74
See application file for complete search history.

(56) References Cited

U.S. PATENT DOCUMENTS

| 10,693,292 B2* | 6/2020 | Tang ................. H02H 9/041 |
| 2003/0086227 A1* | 5/2003 | Coiret ................ H03K 17/168 |
| | | 361/91.5 |
| 2008/0013243 A1 | 1/2008 | Gammel et al. |
| 2013/0100710 A1 | 4/2013 | Kang et al. |
| 2013/0242443 A1 | 9/2013 | Bartel et al. |
| 2017/0187181 A1 | 6/2017 | Kashyap et al. |
| 2017/0373490 A1* | 12/2017 | Zhu ................... H02H 9/046 |
| 2019/0393698 A1 | 12/2019 | Joo et al. |

OTHER PUBLICATIONS

Lin Lawrence, Eslam Alfawy, "Lightning surge discharge design for SMPS applications: Line filter design guidelines with focus on CoolMOS™ P7," Infineon, dated Aug. 31, 2020, pp. 1-29.

* cited by examiner

*Primary Examiner* — Jared Fureman
*Assistant Examiner* — Nicolas Bellido
(74) *Attorney, Agent, or Firm* — Patterson + Sheridan, LLP

(57) ABSTRACT

According to an embodiment, a surge protector includes a capacitor, a switch, and a first transistor. The capacitor charges based on an input power to the surge protector. The switch turns on when the capacitor is charged to a charge threshold. The surge protector outputs the input power when the switch is turned on. The first transistor turns on when a voltage of the input power exceeds a first input voltage threshold such that the capacitor discharges to below the charge threshold and such that the switch turns off. The surge protector stops outputting the input power when the switch is turned off.

20 Claims, 5 Drawing Sheets

SURGE PROTECTOR

TECHNICAL FIELD

Embodiments presented in this disclosure generally relate to protecting electrical equipment. More specifically, embodiments disclosed herein relate to a surge protector.

BACKGROUND

Electrical equipment (e.g., data communication systems, telecommunication systems, Internet-of-Things systems) with battery backup is widely used and is often installed outdoors. This equipment needs protection from electrical surges caused by lightning strikes, which may cause incoming surges in excess of one million watts. Existing designs for surge protectors, however, have encountered difficulty protecting against lightning strikes. As a result, the electrical equipment is not sufficiently protected and may be damaged by lightning strikes, resulting in system downtime.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

This disclosure describes a surge protector that uses one or more transistors to protect electrical equipment from electrical surges (e.g., surges caused by lightning strikes). The surge protector includes a capacitor that charges using an input power to the surge protector. When the capacitor is charged to a charge threshold, a switch in the surge protector turns on, which causes the surge protector to output the input power. When a surge occurs, a control transistor in the surge protector turns on, which causes the capacitor to discharge. When the capacitor discharges to below the charge threshold, the switch turns off, which causes the surge protector to stop outputting the input power. As a result, the surge protector prevents the surge from reaching downstream electrical equipment, in certain embodiments.

Figure 1:
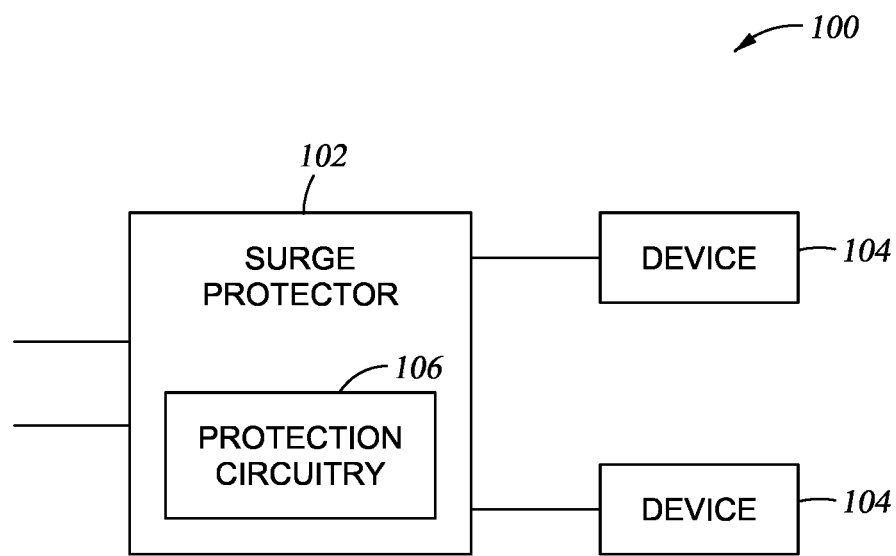
FIG. 1 illustrates an example system.

FIG. 1 illustrates an example system 100. As seen in FIG. 1, the system 100 includes a surge protector 102 and one or more devices 104 connected to the surge protector 102. The surge protector 102 and the devices 104 may include electrical equipment that is installed outdoors. As a result, the electrical equipment may be exposed to lightning strikes that cause electrical surges that damage the equipment. The surge protector 102 protects the electrical equipment from these electrical surges. Specifically, the surge protector 102 uses one or more transistors that switch on or off to prevent the electrical surge from reaching downstream devices 104. Additionally, the surge protector 102 provides other forms of electrical protection. For example, the surge protector 102 may provide a polarity guard function and an inrush current limiting function.

The surge protector 102 receives electrical power (e.g., a DC input power) and outputs the electrical power to the connected devices 104 to power those devices 104. The surge protector 102 includes protection circuitry 106 that cuts off the electrical power to the connected devices 104 when an electrical surge occurs over the input, which prevents the electrical surge from reaching the devices 104. Specifically, and as shown in subsequent figures, the protection circuitry 106 includes one or more transistors that operate to cut off the electrical power when the electrical surge occurs.

Figure 2A:
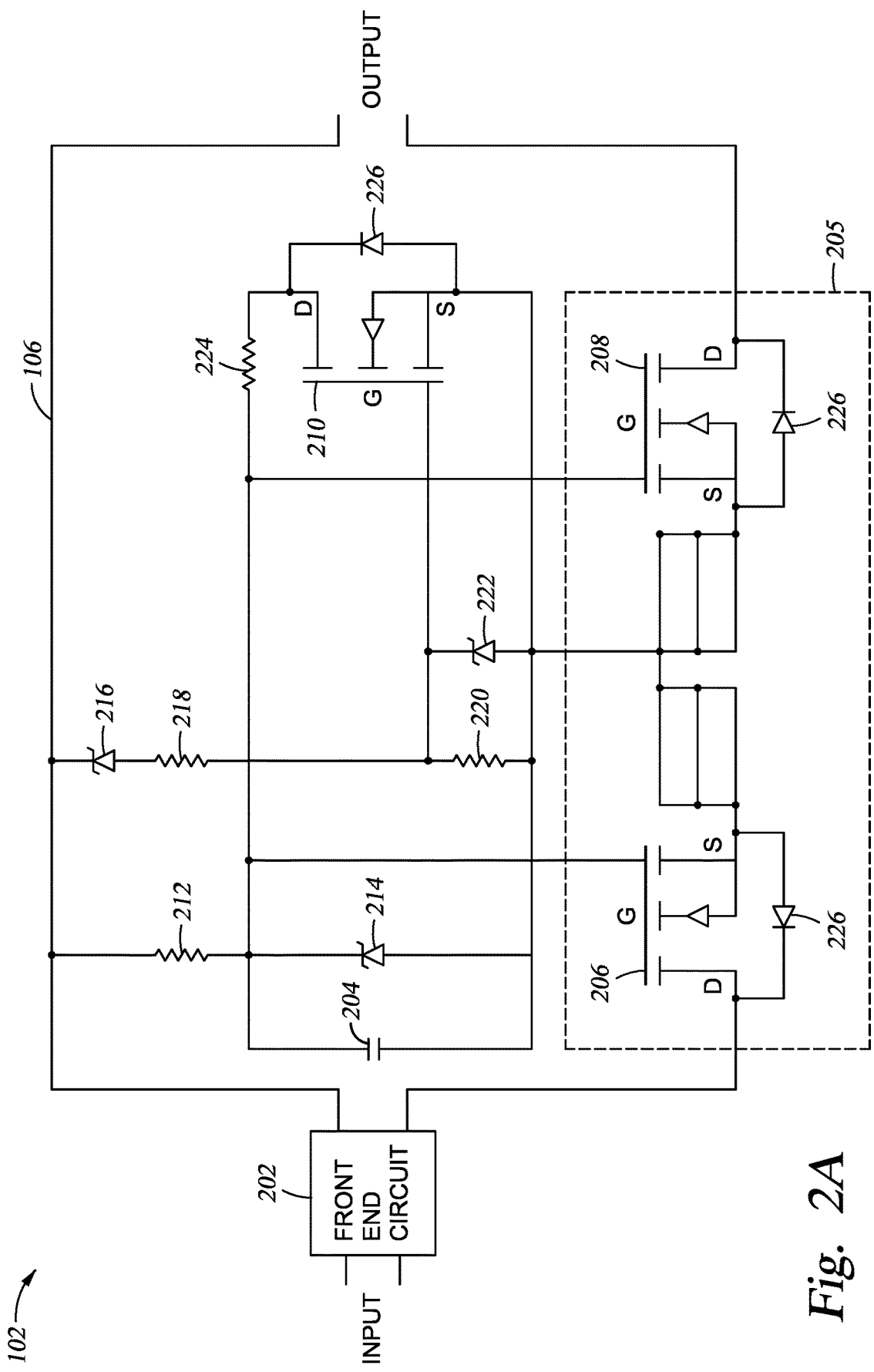
FIG. 2A illustrates an example surge protector in the system of FIG. 1.

FIG. 2A illustrates an example surge protector 102 in the system 100 of FIG. 1. As seen in FIG. 2A, the surge protector 102 includes a front end circuit 202 and protection circuitry 106. The protection circuitry 106 includes a capacitor 204, a switch 205, a control transistor 210, a resistor 212, a Zener diode 214, a Zener diode 216, a resistor 218, a resistor 220, a Zener diode 222, and a resistor 224. In particular embodiments, the protection circuitry 106 electrically protects downstream devices 104.

The front end circuit 202 receives and provides an electrical input power (e.g., a DC input power) to the protection circuitry 106. The front end circuit 202 may include one or more preliminary electrical protection components. For example, the front end circuit 202 may include an electrical fuse that provides some overcurrent protection. As another example, the front end circuit 202 may include an electromagnetic compatibility (EMC) filter that protects against electromagnetic disturbance. As yet another example, the front end circuit 202 may include a surge suppressor that provides some protection against voltage spikes. In some embodiments, the front end circuit 202 does not offer enough electrical protection for the downstream devices 104. For example, the front end circuit 202 may not offer enough protection against electrical surges caused by lightning strikes. The protection circuitry 106 provides additional electrical protection to the downstream devices 104.

The resistor 212 and the capacitor 204 are connected to the front end circuit 202 such that the capacitor 204 charges through the resistor 212 when the front end circuit 202 provides the electrical input power (e.g., the DC input power). The resistance of the resistor 212 and the capacitance of the capacitor 204 affect how quickly the capacitor 204 charges (e.g., 10 milliseconds). Additionally, the Zener diode 214 is connected to the resistor 212 in parallel with the capacitor 204 and limits the voltage to which the capacitor 204 will charge. As a result, the Zener diode 214 sets a charge threshold (e.g., 15 volts) beyond which the capacitor 204 does not charge.

The switch 205 turns on when the capacitor 204 is charged. Specifically, the switch 205 includes power switch transistors 206 and 208 connected in series with one another. The power switch transistors 206 and 208 control an output of the surge protector 102. As seen in FIG. 2A, the sources of the power switch transistors 206 and 208 are connected together. Additionally, the drain of the power switch transistor 206 is connected to the front end circuit 202 and the drain of the power switch transistor 208 is connected to the output of the surge protector 102. The gates of the power switch transistors 206 and 208 are connected to the resistor 212 and the capacitor 204. As a result, as the capacitor 204 charges, the power switch transistors 206 and 208 gradually turn on. When the capacitor 204 has not charged to the charge threshold set by the Zener diode 214, the power switch transistors 206 and 208 are off and do not conduct the electrical input power from the front end circuit 202 to the output of the surge protector 102. When the capacitor 204 has charged to the charge threshold, the power switch transistors 206 and 208 are turned on and conduct the electrical input power from the front end circuit 202 to the output of the surge protector 102. Furthermore, the sources of the power switch transistors 206 and 208 are connected together and the gates of the power switch transistors 206 and 208 are connected together. As a result, the power switch transistors 206 and 208 may turn on and off at the same time.

When a voltage surge occurs (e.g., from a lightning strike) the voltage of the electrical input power spikes. The front end circuit 202 may not be sufficient to prevent the voltage spike from travelling to downstream components. The protection circuitry 106 prevents the voltage spike from reaching downstream devices 104 connected to the surge protector 102. When the voltage of the electrical input power spikes, the Zener diode 216 turns on. Stated differently, the Zener diode 216 sets a voltage threshold, and when the voltage of the electrical input power exceeds the voltage threshold, the Zener diode 216 begins conducting through the resistor 218. As seen in FIG. 2A, the gate of the control transistor 210 is connected to the resistor 218. As a result, when the Zener diode 216 begins to conduct, the control transistor 210 turns on and begins to discharge the capacitor 204 through the resistor 224 that is connected to the drain of the control transistor 210. The resistance of the resistor 224 and the capacitance of the capacitor 204 affect how quickly the capacitor 204 discharges. Discharging the capacitor 204 reduces the voltage across the capacitor 204 below the charge threshold set by the Zener diode 214, which turns off the power switch transistors 206 and 208 so that the switch 205 stops conducting the electrical input power to the output of the surge protector 102. The power switch transistors 206 and 208 may be selected based on their voltage rating so that the power switch transistors 206 and 208 can handle the input surge voltage after the power switch transistors 206 and 208 turn off. As a result, the surge protector 102 prevents the voltage spike on the input from reaching downstream devices 104 connected to the surge protector 102, in particular embodiments.

The resistor 218, the resistor 220, and the Zener diode 222 are connected to the gate of the control transistor 210. In certain embodiments, the resistor 218, the resistor 220, and/or the Zener diode 222 increase the impedance of the gate path of the control transistor 210. As a result, the resistor 218, the resistor 220, and/or the Zener diode 222 limit the gate voltage of the control transistor 210 (e.g., to 15 volts), which protects the control transistor 210 from the voltage spike in the input. In some embodiments, the threshold voltage for turning on the control transistor 210 can be adjusted by adjusting the resistors 218 and 220 (e.g., replacing the resistors 218 and 220 with resistors with different resistances, or using variable resistors).

In certain embodiments, the input impedance of the surge protector 102 is higher than 1 kiloOhm, which limits the surge current that the transistors 206, 208, and 210 experience. This impedance value can be increased if needed. Additionally, the Zener diodes 216 and 222 limit the surge voltage that the transistors 206, 208, and 210 experience. For example, circuit paths of the surge protector 102 may have a minimum impedance of 1 kiloOhm, which is high enough to protect the components of the surge protector 102. The charge and discharge time constants in the circuit paths are high enough to provide high tolerance to input surge voltage and current. Moreover, because the surge protector 102 uses discrete components to provide surge protection, it is simple to adjust component values to suit different application requirements. These component values can be adjusted to provide even higher surge protection level if needed.

As discussed previously, the surge protector 102 also provides other forms of electrical protection to downstream devices 104 connected to the surge protector 102. For example, the surge protector 102 provides a polarity guard function. When the polarity of the electrical input power is reversed, the switch 205 blocks the input power with the reversed polarity. Specifically, the function of the power switch transistor 206 may be represented as a body diode 226 connected between the source and drain of the power switch transistor 206, which blocks the reverse polarity input power. As a result, the surge protector 102 does not output the input power with the reversed polarity, which prevents the input power from reaching downstream devices 104 connected to the surge protector 102.

As another example, the surge protector 102 provides an inrush current limiting function. Because the power switch transistors 206 and 208 gradually turn on as the capacitor 204 charges to the charge threshold, the switch 205 prevents an inrush current over the input from reaching the output of the surge protector 102. In some embodiments, it may take 10 milliseconds to charge the capacitor 204, which provides enough time for the inrush current to settle down. As a result, when the power switch transistors 206 and 208 have turned on and are conducting the input power to the output of the surge protector 102, the input power does not include the inrush current. Stated differently, because the switch 205 does not conduct the input power to the output of the surge protector 102 until the capacitor 204 has charged, the power switch transistors 206 and 208 prevent an inrush current over the input from being conducted to the output.

Figure 2B:
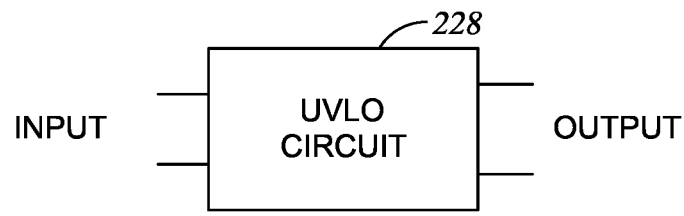
FIG. 2B illustrates an example undervoltage lockout circuit that may be connected to the surge protector of FIG. 2A.

In certain embodiments, the surge protector 102 includes an under voltage lockout (UVLO) circuit that protects downstream devices 104 from input power with voltages that are too low. FIG. 2B illustrates an example UVLO circuit 228 that may be connected to the surge protector 102 of FIG. 2A. In the example of FIG. 2B, the input of the UVLO circuit 228 is connected to the output of the surge protector 102 shown in FIG. 2A. Generally, the UVLO circuit 228 sets a lower limit for the voltage that the UVLO circuit 228 will conduct. As a result, if the voltage of the input power to the surge protector 102 falls below the voltage threshold set by the UVLO circuit 228, then the UVLO circuit 228 blocks the input power and prevents it from reaching downstream devices 104. When the voltage of the input power to the surge protector 102 exceeds the voltage threshold set by the UVLO circuit 228, then the UVLO circuit 228 conducts the input power to downstream devices 104.

Figure 3:
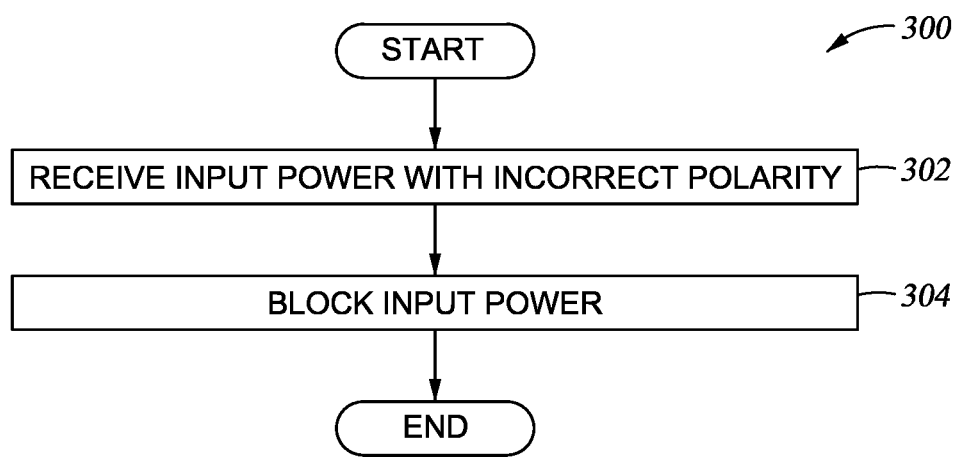
FIG. 3 is a flowchart of an example method performed in the system of FIG. 1.

FIG. 3 is a flowchart of a method 300 performed in the system 100 of FIG. 1. In particular embodiments, the surge protector 102 performs the method 300. By performing the method 300, the surge protector 102 provides a polarity guard function that protects downstream devices 104 from inputs with reversed polarity.

In block 302, the surge protector 102 receives an electrical input power with an incorrect polarity. For example, the surge protector 102 may be configured to receive an electrical power with a certain polarity but instead receives a power with a reversed polarity. In block 304, the surge protector 102 blocks the input power with the incorrect polarity. The surge protector 102 includes a power switch transistor 206 that blocks the input power with the incorrect polarity. Specifically, the function of the power switch transistor 206 is represented as a body diode 226 connected across the source and drain of the power switch transistor 206. The body diode 226 blocks the input power with the reversed polarity. As a result, the power switch transistor 206 prevents the input power with the reversed polarity from reaching the output of the surge protector 102.

Figure 4:
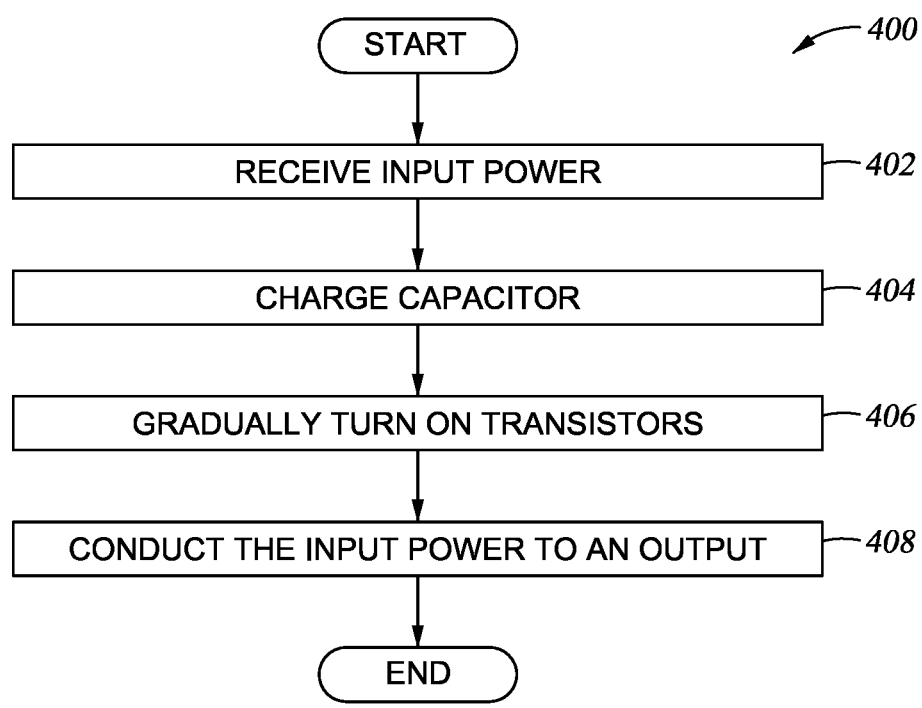
FIG. 4 is a flowchart of an example method performed in the system of FIG. 1.

FIG. 4 is a flow chart of an example method 400 performed in the system 100 of FIG. 1. In particular embodiments, the surge protector 102 performs the method 400. By performing the method 400, the surge protector 102 provides an inrush current limiting function that protects downstream devices 104 connected to the surge protector 102 from inrush currents that occur when electrical power is initially provided to the surge protector 102 and/or the devices 104. Additionally, by performing the method 400, the surge protector 102 transitions from an off state to an on state in which the surge protector 102 conducts an electrical input power to its output.

In block 402, the surge protector 102 receives an electrical input power. A power source may have been recently connected or turned on to provide the input power. As a result, the input power may include an inrush current. In block 404, the input power charges a capacitor 204 in the surge protector 102. The capacitor 204 is connected to the input of the surge protector 102 by a resistor 212. As a result, the capacitor 204 is charged by the input power through the resistor 212. The resistance of the resistor 212 and the capacitance of the capacitor 204 affect the rate at which the capacitor 204 charges. In certain embodiments, the surge protector 102 includes a Zener diode 214 connected to the resistor 212 and the capacitor 204. The Zener diode 214 sets a charge threshold above which the capacitor 204 does not charge. In some embodiments, it may take at least 10 milliseconds to charge the capacitor 204 to the charge threshold set by the Zener diode 214.

In block 406, the power switch transistors 206 and 208 in the switch 205 gradually turn on as the capacitor 204 charges. For example, as the capacitor 204 charges, the voltage across the capacitor 204 increases. The gates of the power switch transistors 206 and 208 are connected to the capacitor 204. As a result, the power switch transistors 206 and 208 gradually turn on as the voltage across the capacitor 204 gradually increases during charging. Thus, the power switch transistors 206 and 208 prevent the initial inrush current from being conducted to the output of the surge protector 102. When the capacitor 204 has charged to the charge threshold set by the Zener diode 214, the power switch transistors 206 and 208 are fully turned on and conduct the input power to the output of the surge protector 102 in block 408. The time it takes for the capacitor 204 to charge to the charge threshold may provide sufficient time for the inrush current to settle down. As a result, the surge protector 102 prevents the inrush current from reaching downstream devices 104 connected to the surge protector 102, in particular embodiments. In some embodiments, the sources of the power switch transistors 206 and 208 are connected together and the gates of the power switch transistors 206 and 208 are connected together, and the power switch transistors 206 and 208 turn on at the same time.

Figure 5:
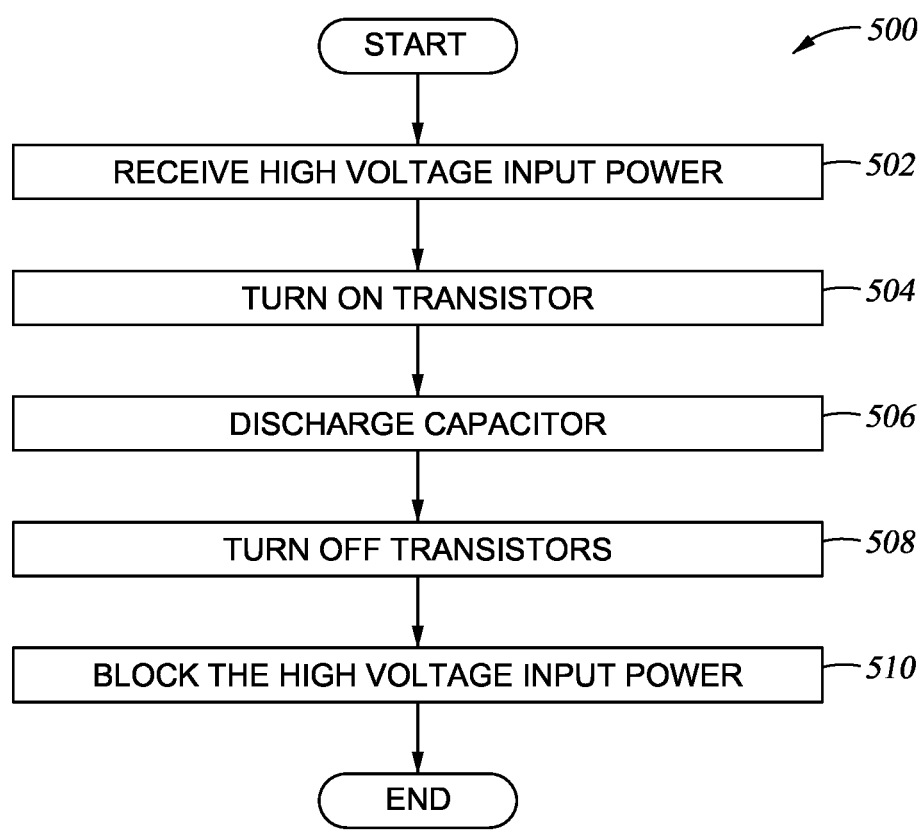
FIG. 5 is a flowchart of an example method performed in the system of FIG. 1.

FIG. 5 is a flow chart of an example method 500 performed in the system 100 of FIG. 1. In particular embodiments, the surge protector 102 performs the method 500. By performing the method 500, the surge protector 102 protects downstream devices 104 connected to the surge protector 102 from voltage surges, such as for example, surges caused by the lightning strikes. The method 500 may be performed after the method 400 (e.g., after the capacitor 204 is charged and the transistors 206 and 208 are turned on).

In block 502, the surge protector 102 receives a high voltage electrical input power. The high voltage input power includes a voltage surge that may damage downstream devices 104 connected to the surge protector 102. For example, the high voltage input power may be caused by a lightning strike. In block 504, the high voltage input power turns on a control transistor 210. The surge protector 102 includes a Zener diode 216 connected to the input of the surge protector 102. The Zener diode 216 sets a voltage threshold that, when exceeded by the voltage of the input power, causes the Zener diode 216 to conduct the input power to the gate of the control transistor 210. As a result, the voltage surge in the high voltage input power is conducted to the gate of the control transistor 210 and turns on the control transistor 210.

When the control transistor 210 is turned on, the capacitor 204 begins discharging through a resistor 224 connected to the capacitor 204 and the drain of the control transistor 210 in block 506. The resistance of the resistor 224 and the capacitance of the capacitor 204 affect how quickly the capacitor 204 discharges. When the capacitor 204 discharges, the power switch transistors 206 and 208 in the switch 205, whose gates are connected to the capacitor 204, turn off in block 508. When the power switch transistors 206 and 208 turn off, the switch 205 stops conducting the high voltage input power to the output of the surge protector 102. As a result, the surge protector 102 blocks the high voltage input power in block 510. In this manner, the surge protector 102 prevents the voltage surge in the input power from reaching downstream devices 104 connected to the surge protector 102. In some embodiments, the power switch transistors 206 and 208 turn off at the same time.

In summary, a surge protector 102 uses transistors 206, 208, and 210 to protect electrical equipment from electrical surges (e.g., surges caused by lightning strikes). The surge protector 102 includes a capacitor 204 that charges using an input power to the surge protector 102. When the capacitor 204 is charged to a charge threshold, the power switch transistors 206 and 208 turn on, which causes the surge protector 102 to output the input power. When a voltage surge occurs, the control transistor 210 turns on, which causes the capacitor 204 to discharge. When the capacitor 204 discharges to below the charge threshold, the power switch transistors 206 and 208 turn off, which causes the surge protector 102 to stop outputting the input power. As a result, the surge protector 102 prevents the surge from reaching downstream electrical equipment, in certain embodiments. Additionally, the surge protector 102 may also provide other forms of electrical protection (e.g., a polarity guard function and an inrush current limiting function).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A surge protector comprising:
a capacitor configured to charge based on an input power to the surge protector;
a switch configured to turn on when the capacitor is charged to a charge threshold, wherein the surge protector is configured to output the input power when the switch is turned on; and
a first transistor configured to turn on when a voltage of the input power exceeds a first input voltage threshold and discharge the capacitor to below the charge threshold such that the switch turns off, wherein the surge protector is configured to stop outputting the input power when the switch is turned off.

2. The surge protector of claim 1, further comprising a Zener diode configured to conduct an electrical current when the voltage of the input power exceeds the first input voltage threshold such that the first transistor turns on.

3. The surge protector of claim 1, wherein the switch comprises a second transistor and a third transistor connected in series with the second transistor, and wherein the second and third transistors are configured to turn on when the capacitor is charged to the charge threshold and to turn off when the capacitor discharges to below the charge threshold.

4. The surge protector of claim 1, further comprising a Zener diode configured to prevent the capacitor from charging beyond the charge threshold.

5. The surge protector of claim 1, further comprising an undervoltage lockout circuit configured to block the input power if the voltage of the input power falls below a second input voltage threshold lower than the first input voltage threshold.

6. The surge protector of claim 1, wherein the switch blocks an input current when a polarity of the input power reverses.

7. The surge protector of claim 1, wherein the capacitor is configured to charge to the charge threshold over a period of time and wherein the switch blocks an inrush current during the period of time.

8. A method comprising:
charging a capacitor in a surge protector based on an input power to the surge protector;
turning on a switch in the surge protector when the capacitor is charged to a charge threshold;
outputting, by the surge protector, the input power when the switch is turned on;
turning on a first transistor in the surge protector when a voltage of the input power exceeds a first input voltage threshold;
discharging the capacitor to below the charge threshold after turning on the first transistor;
turning off the switch after the capacitor is discharged below the charge threshold; and
stopping, by the surge protector, output of the input power when the switch is turned off.

9. The method of claim 8, further comprising conducting, by a Zener diode in the surge protector, an electrical current when the voltage of the input power exceeds the first input voltage threshold such that the first transistor turns on.

10. The method of claim 8, wherein the switch comprises a second transistor and a third transistor connected in series to the second transistor, and wherein the second and third transistors are configured to turn on when the capacitor is charged to the charge threshold and to turn off when the capacitor discharges to below the charge threshold.

11. The method of claim 8, further comprising preventing, by a Zener diode in the surge protector, the capacitor from charging beyond the charge threshold.

12. The method of claim 8, further comprising blocking, by an undervoltage lockout circuit, the input power if the voltage of the input power falls below a second input voltage threshold lower than the first input voltage threshold.

13. The method of claim 8, further comprising blocking, by the switch, an input current when a polarity of the input power reverses.

14. The method of claim 8, further comprising:
charging the capacitor to the charge threshold over a period of time; and
blocking, by the switch, an inrush current during the period of time.

15. A surge protector comprising:
a capacitor configured to charge based on an input power, wherein the surge protector is configured to output the input power when the capacitor is charged to a charge threshold; and
a transistor configured to turn on when a voltage of the input power exceeds a first input voltage threshold and discharge the capacitor to below the charge threshold such that the surge protector stops outputting the input power.

16. The surge protector of claim 15, further comprising a Zener diode configured to conduct an electrical current when the voltage of the input power exceeds the first input voltage threshold such that the transistor turns on.

17. The surge protector of claim 15, further comprising a Zener diode configured to prevent the capacitor from charging beyond the charge threshold.

18. The surge protector of claim 15, further comprising an undervoltage lockout circuit configured to block the voltage of the input power if the input voltage falls below a second input voltage threshold lower than the first input voltage threshold.

19. The surge protector of claim 15, further comprising a switch configured to block an input current when a polarity of the input power reverses.

20. The surge protector of claim 15, further comprising a switch, wherein the capacitor is configured to charge to the charge threshold over a period of time and wherein the switch blocks an inrush current during the period of time.

\* \* \* \* \*